MAGNETIC CORE LOGICAL CIRCUIT

Filed Nov. 23, 1955 2 Sheets-Sheet 1

INVENTOR
LOUIS A. RUSSELL
BY William V. Schelberg
AGENT

Dec. 29, 1959 L. A. RUSSELL 2,919,354

MAGNETIC CORE LOGICAL CIRCUIT

Filed Nov. 23, 1955 2 Sheets-Sheet 2

INVENTOR.
LOUIS A. RUSSELL

BY William V. Schelberg

AGENT

1

2,919,354

MAGNETIC CORE LOGICAL CIRCUIT

Louis A. Russell, Poughkeepsie, N.Y., assignor to International Business Machines Corporation, New York, N.Y., a corporation of New York Application November 23, 1955, Serial No. 548,581

7 Claims. (Cl. 307—88)

This invention relates to magnetic core memory devices and particularly to such devices employed in circuit arrangements capable of performing logical switching functions.

Switching networks of various types have particular use in data handling machines and may be considered broadly as networks or components to which input signals are applied and from which output signals are obtained that are some prescribed function of the input signals. Such components are desirably fabricated from magnetic core elements due to their inherent reliability, lack of maintaining power and heat development, and it is to such arrangements that the present invention directly pertains.

Logical circuit components employing magnetic cores are known in the prior art as shown for example in U.S. Patent 2,695,993, issued November 30, 1954, and the copending U.S. patent application, Serial Number 290,677, filed May 29, 1952, on behalf of M. K. Haynes, however, such devices employ diodes or comparable unidirectional current carrying elements in the coupling circuits between cores. The diodes used in such prior art logical components have low current carrying capacity, operate with large back voltages, develop heat at high speeds and require considerable power, necessitating the use of metallic or so called tape cores with windings having a relatively large number of turns.

It is an object of the present invention to avoid the use of diodes and to provide logical circuit components employing only magnetic core elements and resistors.

Another object of the invention is to provide "and," "exclusive or," "inverter" and "half adder" logical circuit arrangements employing magnetic core elements.

A further object of the invention is to provide logical circuit elements wherein low power requirements are achieved allowing the use of ferrite cores with windings of relatively few turns.

A still further object of the invention is to provide magnetic logical components employing saturable coupling cores for controlling the transfer of impulses between storage cores having a predetermined threshold of coercive force.

Other objects of the invention will be pointed out in the following description and claims and illustrated in the accompanying drawings, which disclose, by way of example, the principle of the invention and the best mode, which has been contemplated, of applying that principle.

2

Figure 5:
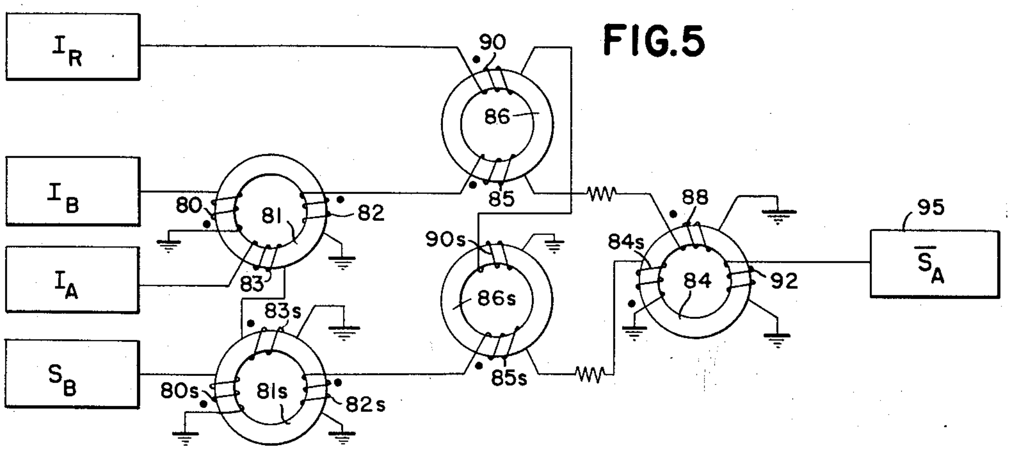

Figure 5 illustrates application of the principles of the invention as applied to an inverter or "not" logical circuit.

Figure 6:
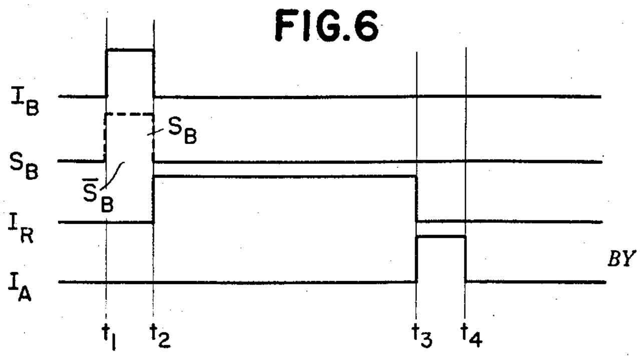

Figure 6 illustrates the relative timing of current pulses employed for operating the circuit devices.

Figures 1, 2:
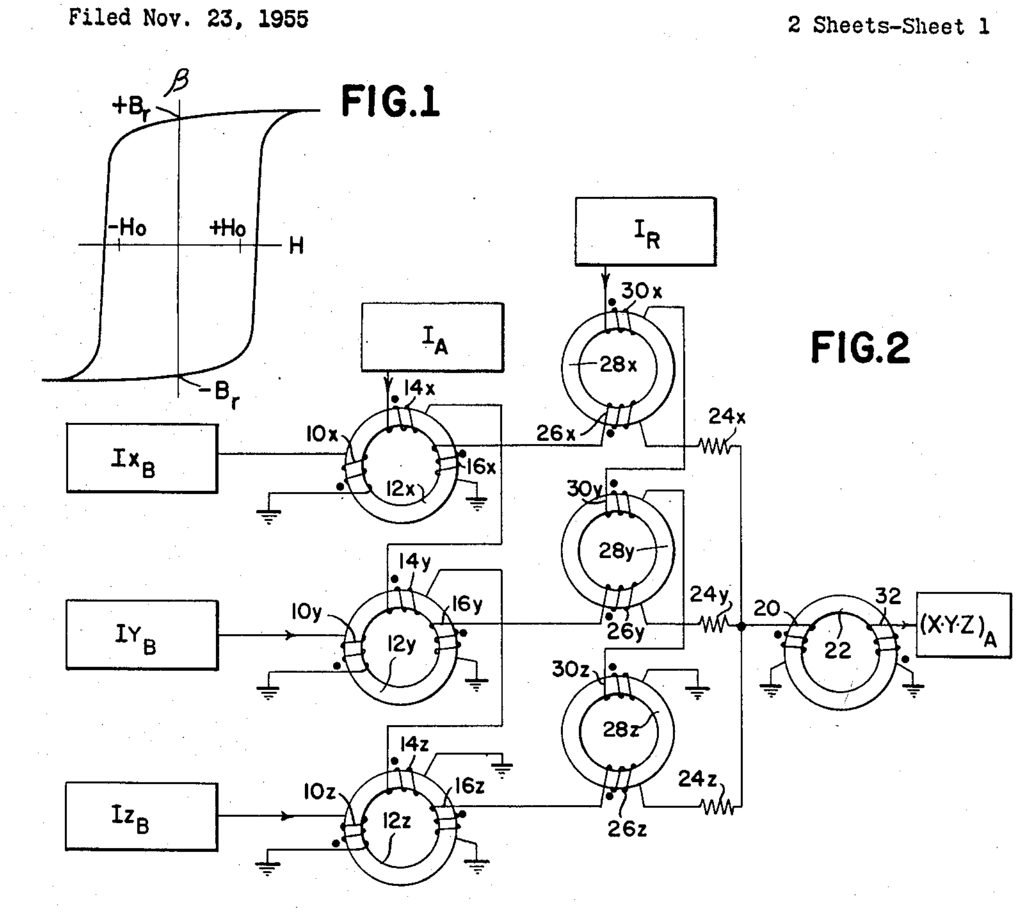
Figure 1 illustrates the hysteresis characteristic of a magnetic core material having a coercive force threshold as required for the storage core elements of the invention.
Figure 2 is a schematic illustration of a three input logical "and" circuit constructed in accordance with the principle of the invention.

Referring now to Figure 1, the hysteresis loop illustrated is representative of a typical characteristic for a square loop ferrite material, with the vertical axis representing magnetic flux density B and the horizontal axis the applied field strength H, wherein the residual flux density is a large fraction of the saturation flux density and the curve has substantially square knees indicative of a threshold coercive force. The storage cores, as referred to hereafter, may be of such square loop material, however, the coupling cores need not have such characteristics provided they have the capability of attaining opposite stable states of remanence. In the description to follow, it is assumed for purposes of explanation that the remanence point designated $-B_r$ represents a binary zero and point $+B_r$ a binary one, with a dot marking being placed adjacent one end of the core windings in the figures to indicate polarity in that current flow into the dot marked terminal tends to switch the core to a binary zero state.

The circuit arrangement shown in Figure 2 is adapted to perform the logical switching function termed "and." For illustration purposes a three way "and" circuit is shown with three input signals required to develop an output signal indicative of their coincident application. The input signals are developed by any type of pulse generating means as for example further logical circuit devices represented in the figure schematically as $Ix_B$, $Iy_B$ and $Iz_B$ and are applied to windings 10$_x$, 10$_y$ and 10$_z$ respectively on three similarly designated cores 12. Each of the cores 12 is also provided with a further pair of windings labeled 14 and 16 with the windings 14 series connected and energized from a clock pulse generator $I_A$. Windings 14 and 16 comprise shift and output windings respectively and the latter windings are connected in parallel through individual resistors 24 and a winding 26 of individual coupling cores 28. The circuit including the parallel connected windings 16$x$, 16$y$ and 16$z$ is coupled to a winding 20 of a single output core 22. The coupling cores 28 are also provided with an additional winding labeled 30 and these windings are series connected in each of the three input branches for energization from a current source $I_R$ which may be a steady state or clock pulse source as will be explained hereafter. The core 22 is provided with an output winding 32 which is activated only if all three input signals are applied to the circuit branches.

The input signal generators $Ix_B$, $Iy_B$ and $Iz_B$ are selectively operable at a time B, and with all such signal impulses applied to the "and" circuit network, the cores 12, previously in a zero remanence state $-B_r$, are driven to a one remanence state $+B_r$ since the current pulses are directed into the unmarked ends of the windings 10. This shift in flux state causes a voltage to develop across the output windings 16 of the cores 12 and current is directed into the unmarked terminals of the windings 26 of coupling cores 28, which cores have been in the magnetic state $-B_r$ and now shift to the $+B_r$ state. As the cores 28 undergo this flux change the windings 26 present a high impedance and the voltage presented across the winding 20 of output core 22 is low. At a time subsequent to B time the clock pulse source $I_R$ operates and resets the cores 28 to the zero or $-B_r$ state. This action causes a voltage to be induced across the windings 26 that is positive at the dot marked terminal so as to tend to drive a current through the windings 16 and set cores 12 toward the zero state but, due to the turns ratio provided, the magnetomotive force developed is less than the coercive threshold of the storage cores 12. The combined outputs of the windings 26 of all of the coupling cores act upon the winding 20 of core 22, however, and set that core from $-B_r$ to $+B_r$ or the one state. A three to two selection ratio is provided by the threshold of core 22, with the resistors 24 adjusted so that the output developed by the resetting of two of the cores 28 is less than the coercive force while that developed by resetting three of the cores 28 exceeds this value.

After the cores 28 have been reset to zero and the output core is set to one, the cores 12 are reset by the $I_A$ clock pulse source. As this occurs and the storage cores are reset from $+B_r$ to $-B_r$ an output voltage is induced in their windings 16 in a direction tending to drive the cores 28 further into negative saturation so that the windings 26 present a low impedance. Current is driven into the dot marked terminal of the winding 20 of core 22, however, and this core now shifts back to $-B_r$ and an output voltage signal is developed on the winding 32 at A clock time.

Since the setting up of core 22 obtains only as a result of resetting of all the cores 28 in accordance with the threshold of core 22, the $I_A$ clock pulse may be employed to reset the output core 22 as well as the storage cores 12 if desired rather than to rely only upon the output of the cores 12 to do so as shown. This action provides a more positive resetting of the core 22 but the additional winding is not required unless the load, schematically illustrated as $(X—Y—Z)_A$ is of low impedance.

The basic principle employed in the circuit is the use of a coercive force threshold of a core in performing logical functions and the use of a saturable coupling core in one or the other remanence state to present a high and a low impedance to current flow in the same direction at different intervals of time, which principles will become more evident in connection with further embodiments to be described.

In the arrangement shown in Figure 2, the storage cores 12, coupling cores 28 and output core 22 may comprise toroids of magnesium-manganese ferrite having an outside diameter of 0.100 inch, inside diameter of 0.070 inch and thickness of 0.030 inch. In a specific embodiment, the cores 12 and 22 may comprise four such stacked toroids as a single core unit and the cores 28, two such toroids. The windings 10 and 20 may comprise 5 turns with the windings 14, 16, 26, 30 and 32 having 15, 10, 30, 15 and 10 turns, respectively. With the resistors 24 each having a resistance of 10 ohms, the $I_A$ pulse generator output may be 150 milliamperes and the $I_R$ pulse generator output 190 milliamperes. The series windings 26 have a large number of turns since, in the specific example here given, the core material for cores 28 is the same as that for the other cores, however, the number of turns may be reduced if a low coercive force material is used in order to reduce the secondary loading on the cores 12 when they are switched to the one state by a signal input.

While particular core materials and circuit values are herein disclosed, their inclusion is in the interest of providing a complete disclosure and should not be considered limiting as to parameters suitable for proper operation. Further, although a three input "and" circuit has been shown and described, a two way "and" is achieved merely by adjustment of the resistors 24, with the core 22 then required to distinguish only on the basis of a two to one selection ratio. Input discrimination may be higher than three to two or may be adjusted to this or a lower ratio by means of bias currents applied to a winding on cores 12 and 22.

Figure 3:
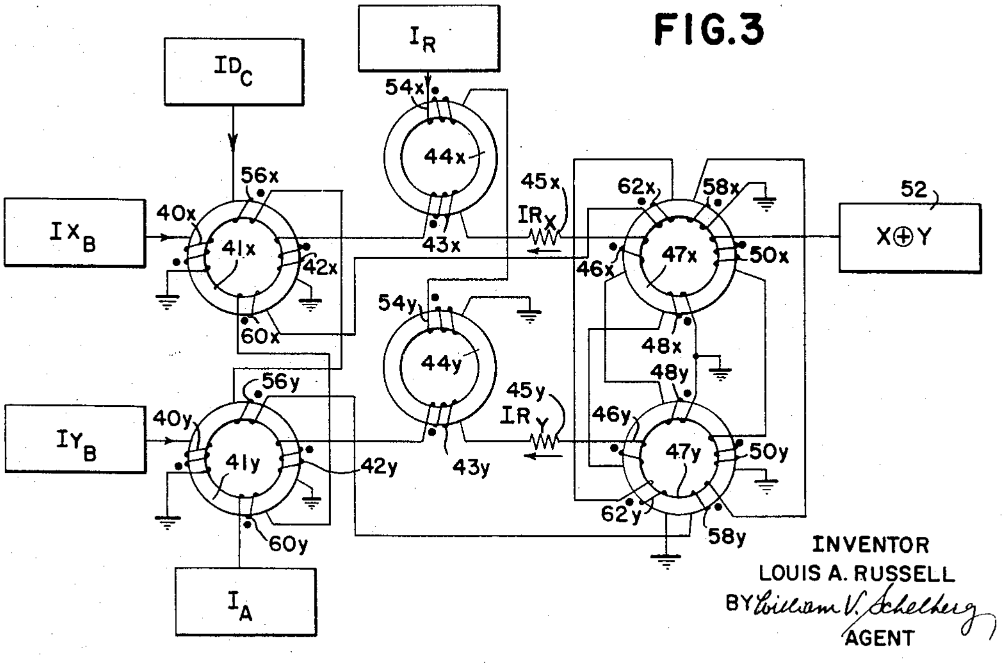
Figure 3 is an illustration of an "exclusive or" logical network.

Another logical circuit embodiment employing the basic operating principles is an "exclusive or" circuit as illustrated in Figure 3 with the logical switching action taking place as a result of series winding currents developed by coupling cores during the time that they are reset.

An "exclusive or" circuit is one that provides an output when one and only one input signal is applied to either one of two or more input terminals. Input signals are selectively applied at a time B from pulse generators $Ix_B$ and/or $Iy_B$ and are directed to input windings 40x and 40y, respectively of a pair of storage cores 41x and 41y. The cores 41 are provided with output windings 42 which are coupled through a winding 43 of a series dot markings. The other terminal of the winding 46 of an output core 47. Each of the cores 47 is provided with a further input windings 48 that is poled in a sense opposite to that of the winding 46 as indicated by the dot markings. The other terminal of the winding 46 of each core 47 is coupled to ground through the winding 48 of the opposite core so as to couple these windings in an opposing sense. The cores 47 are also provided with output windings 50 that are connected in series in an aiding sense to a load device 52. A current generator $I_R$ is connected in series to a winding 54 on each of the coupling cores 44 and a source $I_{DC}$ is connected to bias windings 56 of the cores 41 and bias windings 58 of the cores 47. A clock pulse source $I_A$ is coupled in series to reset windings 60 of cores 41 and reset windings 62 of cores 47.

All the cores may be considered initially in a zero remanence state or at point $-B_r$ on the hysteresis loop of Figure 1. With an input signal delivered by one of the pulse generators $Ix_B$ or $Iy_B$ at a time B and, assuming $Ix_B$ is the one operated, the corresponding core 41x is shifted to a one remanence state, $+B_r$, and a voltage is induced in the output winding 42x of that core but not in the winding 42y of the other core 41y. This voltage causes a current flow through the winding 43x of core 44x, the winding 46x of core 47x and the winding 48y of the core 47y. This current flow is in such a direction as to switch the cores 44x and 47x to the one state and the core 47y to the zero state. The cores 44x and 47x may switch to the $+B_r$ state but core 47y is already at $-B_r$ and no change in remanence state may occur. The number of turns of the windings 43 is made several times that of the windings 46 and the current flow developed by read in to the core 41x develops a magnetomotive force in the core 44 sufficient to completely switch this core to $+B_r$ but negligible switching occurs in the core 47x due to its coercive threshold. At the conclusion of the interval of time B, the cores 41x and 44x stand at $+B_r$ and all the remaining cores at $-B_r$. A reset period now follows during which time the pulse generator $I_R$ functions and resets the core 44x to $-B_r$. As this occurs a voltage is induced across the winding 43x which causes a current $I_{Rx}$ to flow through the loop coupling the winding 42x of core 41x, the winding 46x of core 47x and the winding 48y of core 47y. This current is in such a direction as to tend to switch the cores 41x and 47y to a zero state and the core 47x to a one state. Each of the cores 41x, 41y, 47x and 47y are biased toward a one state by the current supplied by the source $I_{DC}$ and the resistors 45x and 45y are adjusted so that the current $I_{Rx}$ is of a magnitude insufficient to reset the core 41x to zero. Under this condition the core 47x is subjected to a magnetomotive force that switches it to the one state and the core 47y is uneffected since the $I_{Rx}$ through winding 48y opposes that of $I_{DC}$ through the winding 50y.

At the conclusion of this reset period the core 47y is at the zero and 41x and 47x are at the one remanence state. The time period following reset is designated A time and during this interval the pulse generator $I_A$ operates to deliver a clock pulse tending to reset cores 41x and 47x to the zero state with an output developed across the winding 50x of the latter core as it switches to $-B_r$, which pulse is directed to the load device 52.

An output signal has then been delivered as a result of the single pulse from the generator $Ix_B$. If the generator $Iy_B$ rather than $Ix_B$ has operated alone during B time, the core 44y would have switched to the zero state during the reset interval and a current $I_{Ry}$ caused to flow and set up the core 47y. The subsequently applied clock pulse $I_A$ would then produce an output signal from the core 47y.

Should both of the input pulse generators $Ix_B$ and $Iy_B$ operate both of the cores 41x and 41y are switched to the $+B_r$ state and during resetting both the current $I_{Rx}$ and $I_{Ry}$ occur at the same time. Since these currents are of the same relative magnitude there is no net effect on the cores 47x and 47y as the magnetomotive force developed by the windings 46 is opposed by that developed by the windings 48.

Obviously if neither of the input signals are applied during B time none of the cores will change from the zero remanence state and only a zero output signal is developed at A time.

As mentioned previously the coupling cores, cores 44 in the embodiment of Figure 3, need not be of square hysteresis loop material but the storage cores, cores 41 and 47, must have a coercive force threshold. With all cores of square loop type ferrite, however, the winding turns may be made such that the turns of winding 42 are three times the turns of winding 46, the turns of winding 43 are five times the turns of winding 42, with windings 46 and 48 having an equal number of turns.

Figure 4:
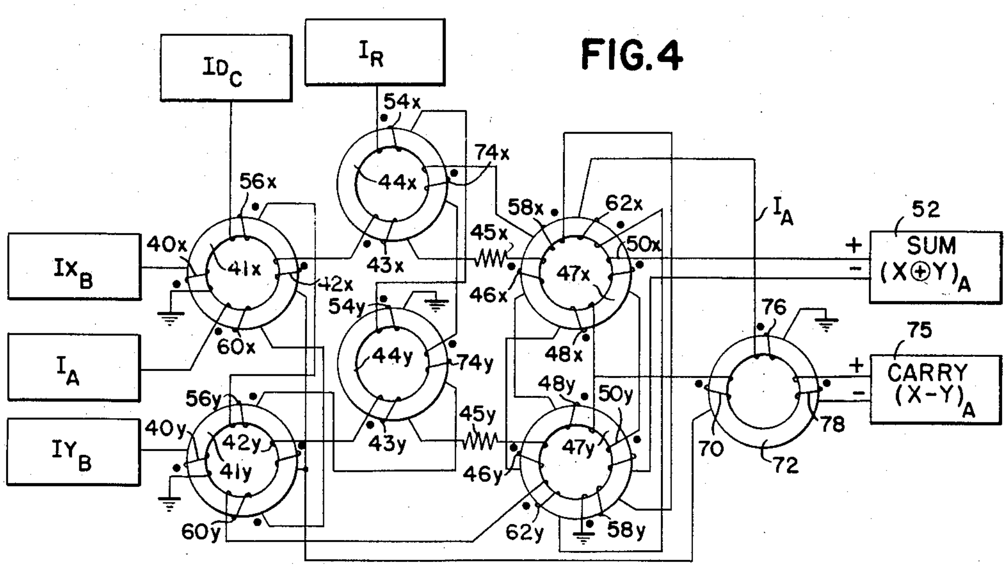
Figure 4 is a schematic drawing of a network of magnetic core elements capable of performing the switching function corresponding to a binary "half adder" component.

A further embodiment of the invention is shown in Figure 4 and comprises a circuit capable of performing the function of a binary "half adder." This function is obtained by coupling the common terminal of the "exclusive or" circuit of Figure 3 to ground through the input winding 70 of a further core 72. In binary addition the sum of a zero and a one signal is a one with no carry while the sum of a one and a one is a zero with a one signal carry to the next higher order. The sum output then is seen to be the function of "exclusive or" and, since the "exclusive or" circuit of Figure 3 is incorporated in this "half adder" system, similar cores and windings are given the same designations to facilitate the explanation. With only one signal applied, as from one of the generators $Ix_B$ or $Iy_B$, the sum output delivered to the load 52 is identical to that explained in connection with Figure 3 but no carry or a zero carry signal is delivered to a load 75 from the carry core 72. This core is provided with a reset winding 76 driven from the clock pulse source $I_A$ and an output winding 78 in addition to the previously mentioned input winding 70 that is connected to the junction of the windings 48x and 48y. The core 70 is of the square loop type having a coercive threshold and is not provided with a bias from the $I_{DC}$ source as are the cores 47. As a consequence, with only one input signal applied to the network the current applied to the winding 70 ($I_{Rx}$ or $I_{Ry}$ alone) is insufficient to exceed this threshold and cause switching of the core 70 to a one state. The current pulse from the clock pulse generator $I_A$ then tends to drive this core further toward the $-B_r$ or zero state during A time and a zero signal is developed in the output winding 78.

If both input signals are applied, the cores 47 do not switch during reset time when $I_R$ operates and, as in the "exclusive or" circuit arrangement alone, no sum signal is delivered to the load 52 at A time. Both the current $I_{Rx}$ and $I_{Ry}$ are applied to the winding 70 of core 72, however, and this carry core is switched at reset time. The following $I_A$ pulse resets this core at A time and the voltage developed across the winding 78 causes a one or carry signal to be applied to the load 75. The schematically illustrated load devices 52 and 75 may be a further "half adder" network to form a "full adder" or may be any other desired form of logical device.

Again, in the interest of providing a full and complete description of the disclosed devices, a practical embodiment of the "half adder" may comprise ferrite cores having a threshold magnetomotive force of 670 milliampere turns with the resistor 45 of 10 ohms, the windings 40, 46, 48, 56, 70 and 74 having five turns, the windings 42, 50, 54, 58, 60, 62 and 78 having ten turns and the windings 43 having forty turns. These values are not to be considered limiting as obviously others may be used satisfactorily.

Referring now to Figure 5, a logical switching network for performing a "not" or inverter function is illustrated. An input signal S is shown as selectively deliverable at B time by a pulse generator $S_B$ and is applied to the input winding 80s of a storage core 81s. The core 81s is provided with an output winding 82s and a shift winding 83s. The output winding 82s is connected to the input winding 84s of an output core 84 through a series winding 85s of a coupling core 86s. A further storage core 81 is provided with an input winding 80 energized at B time from a clock pulse source $I_B$. The winding 83s is series connected with a winding 83 of the core 81 with these windings energized from a clock pulse source $I_A$ at A time. Core 81 is similarly provided with an output winding 82 that is connected through a winding 85 of a coupling core 86 to an input winding 88 of the core 84. The cores 86 and 86s are provided with reset windings 90 and 90s respectively, which are energized from a source $I_R$ and the output core 84 is provided with a winding 92 operable to deliver an output to a load device 95.

The sequence of delivery of pulses from the several sources illustrated is shown in Figure 6 with the pulse from $S_B$ shown in dotted lines to indicate that it may be selectively applied during a time interval $t_1$ to $t_2$. The clock pulse from $I_B$ is delivered during this same interval, the reset pulse from $I_R$ is delivered during the time $t_2$ to $t_3$ and the pulse from $I_A$ is delivered from $t_3$ to $t_4$.

From the time $t_1$ to $t_2$ the clock pulse from $I_B$ occurs and the signal from $S_B$ also is applied if the inverter is to receive an input. $I_B$ switches core 81 to the one state and in doing so causes the core 86 to be switched to the one state due to current in the secondary loop as developed by winding 82. The core 84 is not affected because the number of turns on the winding 85 is made much greater than that of the input winding 88 of the core 84. The flux capacity of the core 81 is made approximately three times that of the core 84 and the flux capacity of the core 86 times the ratio of turns of winding 85 to winding 82 is made equal to or greater than the flux capacity of the core 81. With this arrangement, after $I_B$ has occurred, the volt-time product stored in core 86 is sufficient to completely switch the core 84 to a one state when the core 86 is reset.

From time $t_2$ to $t_3$, the core 86 is reset by the source $I_R$ and core 84 is set to a one state, with the current developed by the winding 85 insufficient to exceed the threshold of the core 81 so that it remains at the one state. With a signal $S_B$ having been applied during the $t_1$ to $t_2$ interval, however, core 86s would also be reset during this $t_2$ to $t_3$ time causing a current to flow through the winding 84s of the core 84 and, due to the fact that windings 88 and 84s are of opposite polarity, the core 84 would then be unaffected and remain in the zero state. Therefore it is seen that the core 84 is set to a one state only if the input signal $S_B$ has not been applied.

From time $t_3$ to $t_4$, the clock pulse from driver $I_A$ occurs and core 81 is driven to the zero state causing a current flow into the dotted end of the winding 85 of core 86 so that little impedance is presented thereby as it is already in the zero state. This current flows into the dot marked end of the winding 88 of core 84 and causes it to switch to zero if it had been in a one state due to the absence of the signal $S_B$ as described above. If the signal had been previously applied, an output current would also have been developed to drive current through the windings 84s in an inhibiting direction but this would cause no change in the output on 92 as the core 84 would have been at zero. This inhibition, however, does tend to reduce the magnitude of a zero signal advantageously.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a magnetic core logical switching network, a plurality of storage magnetic cores having a substantially rectangular hysteresis characteristic; input, output and shift winding means on said cores; a coupling magnetic core associated with each said storage core, at least one output magnetic core, each said coupling core and an output core capable of attaining bistable states of residual magnetization, control and shift winding means on said coupling cores; winding means including an input and output winding on said output core, circuit means connecting the output winding means of said storage cores with the control winding means of the associated one of said coupling cores and the input winding of said output magnetic core, information representing signal means for energizing the input winding means of said storage cores to cause a voltage to be induced on the output winding means of said storage cores to set the associated coupling core in an information representing residual state, means for establishing a datum residual state in said storage cores including the shift winding means associated therewith, and pulse generator means for establishing a datum residual state in said coupling cores including the shift winding means associated with said coupling cores whereupon said output core is set to an information representing residual state.

2. In a magnetic core logical switching network as set forth in claim 1, wherein said circuit means comprises a series circuit including a resistor.

3. In a magnetic core logical switching network as set forth in claim 1, wherein said circuit means comprise a series circuit including a resistor and said means for establishing a datum residual state in said coupling cores is operable prior to the operation of said means for establishing a datum residual state in said storage cores.

4. A logical "and" circuit network comprising a plurality of storage magnetic cores and an output magnetic core each capable of attaining one or the other stable residual magnetic states and having a substantially rectangular hysteresis characteristic, a coupling magnetic core associated with each said storage core, said coupling cores being capable of attaining one or the other residual magnetic state, winding means including input, output and shift windings on said storage cores, winding means on said coupling cores including control and shift windings, winding means on said output core including input and output windings, circuit means connecting the output winding of each said storage core with the control winding of the associated coupling core and the input winding of said output core, means for selectively applying an input signal to said input windings of said storage cores, means for energizing the shift windings of said coupling cores, and further means for subsequently energizing the shift windings of said storage cores whereupon an output signal is developed on the output winding of said output core when all the said storage core input windings have been energized.

5. A logical "exclusive or" circuit network comprising a pair of storage magnetic cores and a pair of output magnetic cores each capable of attaining one or the other stable residual state and having a substantially rectangular hysteresis characteristic, a coupling magnetic core associated with each said storage magnetic core; said coupling magnetic cores being capable of attaining one or the other stable residual magnetic state; winding means including input, output and shift windings on said storage cores; winding means including shift and control windings on said coupling cores; winding means on said output cores including first and second oppositely poled input windings, a shift winding and an output winding; circuit means connecting the output windings of said storage cores with the control windings of the associated coupling core, the first input winding of one of said output cores and the second winding of the other of said output cores, means connecting the output windings of said output cores in series aiding polarity to a load device, means for selectively energizing the input winding of said storage cores, means for energizing the shift windings of said coupling cores, and means for subsequently energizing the shift windings of said storage cores and said output cores whereupon an output signal is delivered to said load device when one and only one input signal has been applied.

6. A logical circuit network for performing the function of a "half adder" comprising a pair of storage magnetic cores, a pair of sum magnetic cores and a carry magnetic core each capable of assuming one or the other stable state of magnetic remanence and having a substantially rectangular hysteresis characteristic; a coupling magnetic core associated with each said storage core, said coupling cores being capable of attaining opposite states of remanence flux density; winding means including input, output and shift windings on said storage cores; winding means on said coupling cores including shift and control windings; winding means on said sum cores including first and second oppositely poled input windings, shift windings and output windings; winding means for said carry core including an input winding and an output winding; circuit means connecting the output windings of said storage cores with the control windings of the associated coupling core, the first input winding of one of said sum cores, the second input winding of the other of said sum cores and one input winding of said carry core; means connecting the output windings of said sum cores in series aiding polarity to a sum output load device; means connecting the output winding of said carry core to a carry load device; means for selectively energizing the input windings of said storage cores; means for energizing the shift windings of said carry cores; and means for subsequently energizing the shift windings of said storage cores, said sum cores and said carry core.

7. A magnetic core "inverter" circuit comprising a pair of storage magnetic cores and an output core capable of assuming alternate stable residual magnetic states in representing binary information and having a substantially rectangular hysteresis characteristic; input, output and shift winding means on said storage cores; a coupling magnetic core associated with each said storage core; shift and control winding means on said coupling cores; a pair of oppositely poled input winding means and output winding means on said output core; means for periodically energizing the input winding means of one of said storage cores; means for selectively energizing the input winding means of the other of said storage cores; means for subsequently energizing the shift winding means of said coupling cores; means for thereafter energizing the shift winding means of said storage cores; circuit means connecting the output winding means of one said storage cores with the control winding means of the associated coupling core and one of the input winding means of said output cores; and further circuit means connecting the output winding means of the other of said storage cores with the control winding means of the associated coupling core and the other input winding means of said output core.

References Cited in the file of this patent

UNITED STATES PATENTS

| | | |
|---|---|---|
| 2,683,819 | Rey | July 13, 1954 |
| 2,742,632 | Whitely | Apr. 17, 1956 |
| 2,751,509 | Torrey | June 19, 1956 |